(12) United States Patent
Sun et al.

(10) Patent No.: US 7,308,092 B1
(45) Date of Patent: Dec. 11, 2007

(54) METHOD FOR CONNECTING CALLS DIRECTED TO A PSTN EXTENSION TO A HANDSET OF A PACKET SWITCHED NETWORK

(75) Inventors: Shirley Sun, Saratoga, CA (US); Chien-Sheng Wu, Fremont, CA (US)

(73) Assignee: Altigen Communications, Inc., Fremont, CA (US)

( * ) Notice: Subject to any disclaimer, the term of this patent is extended or adjusted under 35 U.S.C. 154(b) by 1063 days.

(21) Appl. No.: 10/319,386

(22) Filed: Dec. 13, 2002

(51) Int. Cl.
*H04M 3/54* (2006.01)
*H04M 3/58* (2006.01)
*H04L 12/66* (2006.01)

(52) U.S. Cl. .............. 379/211.02; 370/259; 370/352; 370/355; 370/356; 379/212.01; 455/417

(58) Field of Classification Search ........ 370/352–356, 370/259; 455/411, 417; 379/211.01–211.04, 379/212.01
See application file for complete search history.

(56) References Cited

U.S. PATENT DOCUMENTS

| 6,125,126 A * | 9/2000 | Hallenst.ang.l | 370/522 |
| 6,320,857 B1 * | 11/2001 | Tonnby et al. | 370/352 |
| 7,003,287 B2 * | 2/2006 | Roeder | 455/417 |
| 2003/0186680 A1 * | 10/2003 | Bhasin et al. | 455/411 |

* cited by examiner

*Primary Examiner*—Harry S. Hong
(74) *Attorney, Agent, or Firm*—Townsend and Townsend and Crew LLP; Kenneth R. Allen

(57) ABSTRACT

A method for connecting a telephone call for an extension coupled to a Public Switched Telephone Network (PSTN) to a handset coupled to a packet switched network is provided. Log-in information for the handset coupled to the packet switched network is received. An active handset for the extension is then deactivated in response to receiving the log-in information if there is an active handset. The method activates the handset using the log-in information. When a telephone call for the extension is received, a network address associated with the handset is determined. The telephone call is connected through the packet switched network to the handset coupled to the packet switched network at the network address.

29 Claims, 6 Drawing Sheets

METHOD FOR CONNECTING CALLS DIRECTED TO A PSTN EXTENSION TO A HANDSET OF A PACKET SWITCHED NETWORK

CROSS-REFERENCES TO RELATED APPLICATIONS

The present invention is related to U.S. patent application Ser. No. 08/818,390, entitled Mixed-Media Communication Apparatus and Method, filed Mar. 14, 1997, and assigned to the present assignee. This application is herein incorporated by reference for all purposes.

BACKGROUND OF THE INVENTION

The present invention relates to telecommunications. More specifically, the present invention relates to telephone and telecommunication systems and service for communication across networks.

As society becomes increasingly mobile, communicating with a person who is constantly traveling becomes very difficult and important telephone calls that require immediate responses may be missed. For example, a call to the traveler's work extension will often only be answered by a voicemail service. Thus, important telephone calls that require immediate responses may be missed. The caller may leave a voicemail but the caller must rely on the traveler checking their voicemail and calling them back. As such, a caller is not automatically connected with a recipient when the recipient's extension is called.

One technique that may be used to automatically connect a caller is known as call forwarding. One method of call forwarding includes using a star code to forward calls for a telephone number. Once the star code and the forwarding number are entered, all calls to the original location are forwarded to the forwarding number. This technique has many drawbacks. For example, if the person is not at the telephone number, the forwarded call will go unanswered. Furthermore, the voicemail at the forwarded telephone number may not be dedicated to the person.

In some cases, a telephone call may be forwarded to a cell phone, or the like. However, drawbacks to this include that a user must typically be within a region where his phone company has coverage, else the user will incur large roaming charges for incoming or outgoing calls.

Thus, in light of the above, what is desired are improved methods for forwarding telephone calls to a remote user.

BRIEF SUMMARY OF THE INVENTION

A method for connecting a telephone call for an extension coupled to a Public Switched Telephone Network (PSTN) to a handset coupled to a packet switched network is provided by embodiments of the present invention.

In one embodiment, log-in information for the handset coupled to the packet switched network is received. An active handset for the extension is then deactivated in response to receiving the log-in information if there is an active handset. The method activates the handset using the log-in information.

When a telephone call for the extension is received, a network address associated with the handset is determined. The telephone call is connected through the packet switched network to the handset coupled to the packet switched network at the network address.

In one embodiment, a computer program product including tangible memory having code configured to direct a telecommunications system to operate according to the methods described is also provided.

A further understanding of the nature and advantages of the invention herein may be realized by reference of the remaining portions in the specifications and the attached drawings.

DETAILED DESCRIPTION OF THE INVENTION

Figure 1:
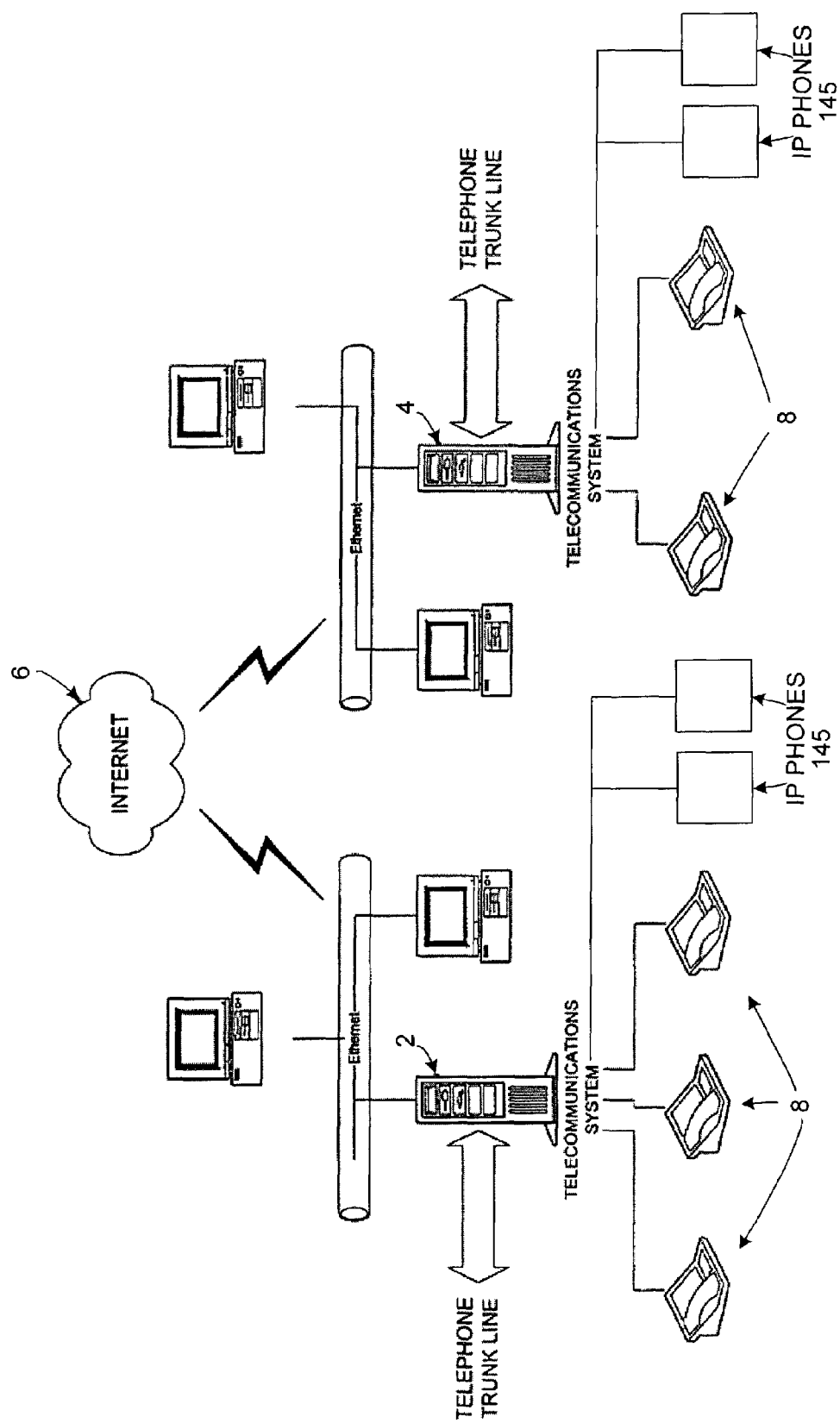
FIG. 1 is an overview block diagram of an embodiment of the present invention.

FIG. 1 is an overview block diagram of an embodiment of the present invention. FIG. 1 illustrates a telecommunications system 2 and a telecommunications system 4, coupled via a network 6.

Each telecommunications system typically provides conventional telephone service to a plurality of respective telephones 8 and a plurality of Internet Protocol (IP) phones 145. Further, each telecommunications system also provides telephone service across computer networks, for example wide area networks including the Internet, internal intranets, and the like. Further description of these capabilities will be given below. Further disclosure can be found in: U.S. patent application Ser. No. 08/818,390, entitled Mixed-Media Communication Apparatus and Method, filed Mar. 14, 1997, and assigned to the present assignee. This application is herein incorporated by reference for all purposes.

In the present embodiment, a caller coupled to telecommunications system 2 typically picks-up the telephone handset, and dials a desired telephone number. When the telephone number is an internal extension, telecommunications system 2 couples the call to the other extension; and when the telephone number is an outside telephone number, telecommunications system 2 typically couples the call to the telephone trunk line.

When the user dials specific telephone numbers, telecommunications system 2 may determine that the most efficient method for making the telephone call is through network 6. In response, telecommunications system 2 formats the telephone call request, and sends the data to telecommunications system 4. When telecommunications system 4 receives the telephone call request, telecommunications system 4 determines the telephone number, and then rings that telephone. Alternatively, telecommunications system 4 may determine that the telephone call request is for IP phone 145 and may connect the call to a network address of EP phone 145. As before, the telephone call may be for an internal IP extension or for an outside EP telephone 145. If the telephone call is for an internal EP extension, telecommunications system 4 may connect the call through an intranet, or the like, to the EP extension. If the telephone call is for an outside IP telephone 145, telecommunications system 4 connects the call through a packet-switched network, or the like, to the outside EP phone 145. When IP telephone 145 is answered, the caller and the receiver can then communicate.

In the present embodiment, as the caller or the receiver communicate, the analog data, typically their voices, are digitized and fragmented into packets of data by the telecommunications systems. These packets of data are then passed to the other telecommunications system via computer network 6. The other telecommunications system re-assembles the data packets and converts them back into analog form for telephones 8. Additionally, the other telecommunications system may send the re-assembled data packets to IP phone 145.

When making a network telephone call, telecommunications systems typically use a combination of network protocols to help ensure the arrival of data across the network. For example, in the present embodiment, transmission control protocol (TCP) is used. In alternative embodiments of the present invention, other control protocols, and other combinations of control protocols may be used, for example: TCP, IP, UDP, and the like.

Figure 2:
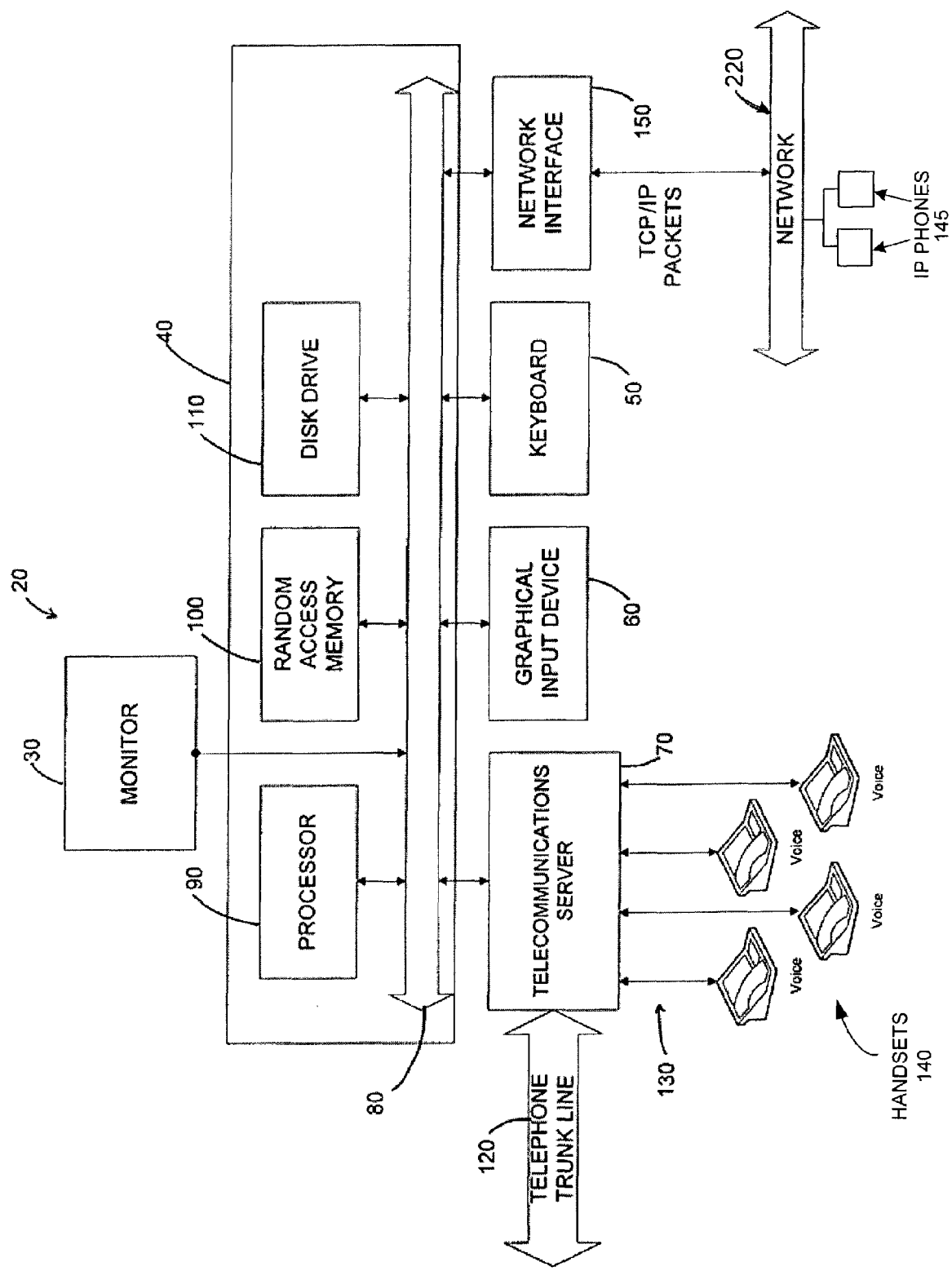
FIG. 2 is a block diagram of a telecommunications system according to an embodiment of the present invention.

FIG. 2 is a block diagram of a telecommunications system 20 according to a preferred embodiment of the present invention. Telecommunications system 20 includes a monitor 30, a computer 40, a keyboard 50, an input device 60, and a telecommunications server 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to telecommunications server 70. Handsets 140 (also telephones or telephone handsets) may be coupled to individual telephone lines 130. Also, IP telephone handsets 145 may be coupled to network 220.

Handsets 140 may be analog signal telephone handsets, however, alternatively they may be any well known type of digital or analog telephone handset. Also, IP handsets 145 may be any well known type of IP handsets. Handsets 140 are typically connected through a number for a Public Switched Telephone Network and IP handsets 145 are connected through an IP address for a packet switched network. Handsets 140 and EP handsets 145 may be associated with an extension. Based on an active handset from either handsets 140 or IP handsets 145, telephone calls for the extension can be forwarded to the active handset. Although IP handsets 145 are described, it will be understood that any handset capable of communicating through a packet switched network may be used, such as a soft phone (a handset emulator application running on a computer).

A mouse is but one example of an input device 60, also known as a pointing device. Other types of input devices may include trackballs, drawing tablets, microphones (for voice activated input), and the like. Telecommunications system 20 may be coupled to a computer network 150 through use of a network interface 160 such as an Ethernet card, a modem, and the like.

RAM 100 and disk drive 110 are examples of tangible media for storage of data, message files, computer programs, drivers for the telecommunications server, embodiments of the herein described methods, and the like. Other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, telecommunications system 20 includes a PC compatible computer having an Althalon™ XP or Pentium IV™ based microprocessors, or the like. Further, in the present embodiment, telecommunications system 20 utilizes the WindowsNT™ or Windows XP™, or other operating systems from Microsoft Corporation, and runs AltiWareOE software from AltiGen Communications, Inc. Telecommunications server 70 are preferably embodied as a Triton DSP PCI based and at least one Quantum™ telephony ISA based plug-in expansion boards from AltiGen Communications, Inc. These boards are also coupled to a dedicated data bus, such as the MVIP bus, or the like.

FIG. 2 is representative of but one type of system for embodying the present invention. It will be readily apparent to one of ordinary skill in the art that many system types of hardware and software configurations are suitable for use in conjunction with the present invention. For example, processor such as the G4 from Motorola, Celeron from Intel, and the like may be used, further any computer communications bus may be used in alternative embodiments of the present invention. Further telecommunications system 20 may operate under the LINUX operating system, may operate under MAC OS from Apple Computer, and the like.

Figure 3:
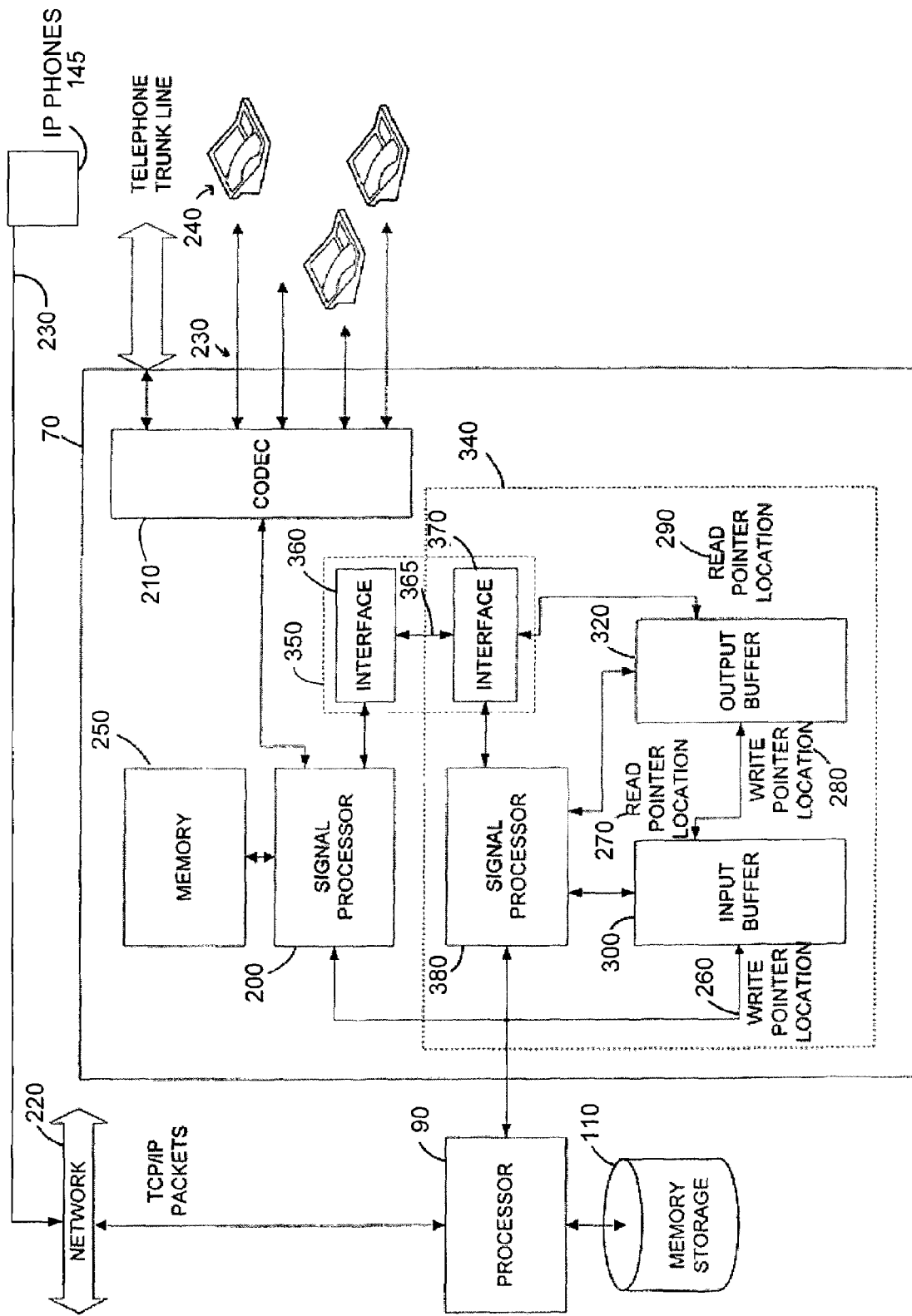
FIG. 3 is a more detailed block diagram of a portion of a telecommunications system according to an embodiment of the present invention.

FIG. 3 is a more detailed block diagram of a portion of a telecommunications system according to an embodiment of the present invention. FIG. 3 illustrates processor 90, disk drive 110, and telecommunications server 70. In the present embodiment, telecommunications server 70 includes a signal processor 200, a digital to analog and analog to digital coder (CODEC) 210, and a memory 250. Telecommunications server 70 interfaces with telephone extension lines 230, and in turn, telephone extension lines 230 are coupled to telephone handsets 240. In one embodiment, handsets 240 is similar to handsets 140. Also, telecommunications server 70 interfaces with IP phone 145 through network 220. Processor 90 is coupled to a computer network 220, as discussed above.

In FIG. 3, processor 90 is used to control the operation of telecommunications server 70 according to instructions from the AltiWare software previously described. In one embodiment of the present invention, AltiWare software, operates in a multi-threaded multi-tasking environment, where each thread monitors the status of a particular telephone extension line 230. The status of the particular telephone extension line is typically represented as a state machine in the software.

In the present embodiment, processor 90 is also used to convert incoming audio messages to message files in a predefined storage format, and to convert message files and voice prompt files from predefined storage formats to an output format (typically digital signals). In the present embodiment, two specific storage format can be used for audio messages including the well-known ".wav" file format, and a pulse coded modulation scheme (PCM). The voice data is typically stored and played-back in a streaming manner.

In other embodiments of the present invention, a single storage format may be used. In other embodiments, other formats for storage of audio messages and the like are known to those of ordinary skill in the art and can be used. For example, formats such as the "RealAudio" format, from Real Networks, Inc., Motion Picture Experts Group Player 3, MP3, G.723.1 and the like may be also be used in embodiments of the present invention.

In the present embodiment, memory storage 110 is used to store audio messages, such as voice messages, numeric telephone numbers, caller databases, voice prompt files, computer network addresses: for example IP addresses, domain names, available ports; embodiments of the present invention, e-mail addresses, data and the like.

In this embodiment, processor 90 is also used to maintain a list of telephone numbers and a mapping of these telephone numbers. In particular, processor 90 maintains a list of physical telephone extensions 230 and "virtual" telephone numbers, i.e. telephone numbers that are accessed across computer network 220. As will be described further below, when a telephone call is received, processor 90 determines whether the telephone call is a physical telephone extension or a virtual telephone number.

In the case the telephone call is for a physical telephone extension, in this example, processor 90 connects the telephone call to the appropriate telephone extension 230. In the case the telephone call is for a virtual telephone number, processor 90 initially determines a remote telecommunications system is associated with the virtual telephone number. In another embodiment, signal processor 200 maintains the list of telephone numbers and performs the mapping. In still another embodiment, processor 90 and signal processor 200 work together to maintain the list and perform the mapping.

In the case where the telephone call is for IP phone 145, in this example, telecommunications server 70 connects a call to a network address of IP phone 145. Data packets are then processed as described below and forwarded to IP phone 145.

In the present embodiment, processor 90 is also used to implement telephone switching functionality. For example, incoming telephone calls may automatically routed to a computer process that may automatically or manually route telephone calls. In the present embodiment, types of switching functions that may be provided include, automatically forwarding telephone calls, transferring telephone calls, conference calls, and the like. In the present embodiment, the functions available are programmable by the administrator of the telecommunications system. Further, functions available from the telephone switching system may be programmable according to time of day, location of the caller, and the like. Other programmable functions may also include setting time-out limits, setting calling limits, and the like.

A packet portion 340 is used to handle packetized communications between telecommunications system and a remote telecommunication server. Similarly, as a remote telecommunications system, packet portion 340 is then used to handle communications between it and telecommunications system.

Signal processor 200 is embodied as a Texas Instruments TMS320C5X digital signal processor (DSPs), and is coupled to receive instructions, data, and the like from processor 90. Of course DSPs from other manufacturers may be used in other embodiments of the present invention. Memory 250 is used to store local instructions, voice recognition algorithms, data for signal processor 200, DTMF data, and the like.

In the present embodiment, signal processor 200 also provides telephone switching functionality to each telephone extension line. For example, in this embodiment, signal processor 200 is used to detect off-hook conditions, to provide tone generation, to detect and process key-pad (DTMF) tones generated from each telephone handset 240, to connect incoming telephone calls to appropriate extensions, and the like. Other types of switching are contemplated, such as handling incoming and outgoing trunk calls, call transfers to and from IP trunks, call forwarding, message notification, reminder calls, multi-location conferencing, call parking, call waiting, and the like. In some embodiments, signal processor 200 and/or processor 90 are both used to handle automatic call distribution, system call-backs, calling out from voice mail, boomerang, dial last caller, speed dialing, call accounting, CallerID, voice mail, mixed media messaging, MS Exchange integration, client console support, and the like.

In one embodiment, signal processor 200 is also used to provide messaging functionality, such as an implementation of a voice mail server. In particular, signal processor 200 outputs instructions, user prompts, messages from voice mail boxes, and the like, to the messaging user. Further, signal processor 200 receives function selections in the form of DTMF tones, spoken instructions, spoken messages, and the like from the messaging user. As discussed above, memory storage 110 may be used to store data associated with the messaging functionality, such as voice prompts, the incoming messages, outgoing messages, and the like.

In another embodiment, signal processor 200 is also used to convert or "recognize" particular incoming audio messages and translate the messages into a computer recognizable form. For example, signal processor 200 can recognize the spoken words "three, two, one" as the numeric number "3,2,1", e.g. ASCII character equivalents. As another example, signal processor 200 can recognize the spoken word "yes" or "ok" as an affirmative response, and "no" as a negative response. In some embodiments, signal processor 200 can use any conventional voice recognition algorithms. In embodiments destined for non-English speaking countries, voice recognition algorithms specific to the native languages may be used.

In an alternative embodiment of the present invention, processor 90 may be used to perform the voice recognition process instead of signal processor 200. In still another embodiment, the voice recognition process may be split between processor 90 and signal processor 200.

Signal processor 200 typically comprises a multi-process environment wherein each process monitors the off-hook and in some embodiments the messaging the status of a particular telephone extension line 230. The status of the particular telephone extension line in off-hook mode is represented as a state machine within signal processor 200. Further, the status of the particular telephone extension line within a voice mail messaging mode is represented as another state machine within signal processor 200. In one embodiment of the present invention, signal processor 200 can process up to twelve telephone extension lines being simultaneously in off-hook mode or in voice mail messaging mode. In alternative embodiments, monitoring of states of a greater or fewer number of telephone extension lines 230 is contemplated.

As is illustrated in FIG. 3, CODEC 210 is used to provide an interface between users on telephone extension lines 230 and signal processor 200. In the present embodiment, CODEC 210 digitizes analog messages and analog signals from users on telephone extension lines 230. CODEC 210 also converts digital signals from signal processor 200, processor 90, and the like, into analog signals for users on telephone extension lines 230. In the present embodiment, the analog signals include audio messages to and from users, dial tone and multifreqency (DTMF) tones, and the like. The analog signals also include voice prompts or phrases that provide voice prompting capability to users on telephone extension lines 230, messages recorded by users, and the like. Examples of voice prompts or phrases, include messages that instruct the user which keys on a telephone to select to perform particular functions, messages that tell the user how many messages are pending, requests for instructions, requests user input, and the like.

FIG. 3 also illustrates an interface 350 between signal processor 200 and packet portion 340. In this example, interface 350 includes interface logic 360 and 370, and physical/logical interface 365. In the present embodiment, physical/logical interface 365 follows the MVIP-90 compatible protocol, and interface logic 360 and 370 provides the appropriate signaling. In alternative embodiments of the present invention, alternative interfaces, such as specified by Dialogic, and the like may also be used.

In the present embodiment, packet portion 340 includes signal processor 380 and an input buffer 300 and an output buffer 320. Locations where input buffer 300 are written to are specified by a write pointer 260, and locations where input buffer 300 are read from are specified by a read pointer 270. Further, locations where output buffer 320 are written to are specified by a write pointer 280, and locations where output buffer 320 are read from are specified by a read pointer 290.

Signal processor 380 provides write pointer 260, read pointer 270, write pointer 280, and read pointer 290, to input buffer 300 and output buffer 320, respectively. Further, signal processor 200 stores and retrieves data from these buffers, in response to the pointer, as will be described further below. In the present embodiment, input buffer 300 is typically a 80 byte wide×20 deep buffer, and output buffer 320 is typically a 40 byte wide×80 deep buffer. These buffers may be embodied as one or more dynamic random access memories (DRAM). The buffers are typically circular, so that locations can be reused. In alternative embodiments, different sized memories can also be used.

Signal processor 380 is typically a multi-process environment. Accordingly, in the present embodiment, eight network based telephone calls can be performed at the same time. To implement this capability, input buffer 300 and output buffer 320 are typically segmented, such that each network based telephone call supported, have use of a reserved portion of the respective buffers. For example, a first telephone call is allocated use of input buffer locations 0-1023, a second telephone call is allocated use of input buffer locations 1024-2023, and the like. Further, for each network based telephone call, separate read and write pointers for each buffer may be allocated and maintained. For example, an input buffer write pointer associated with the first call may point to location 1000, whereas an input buffer write pointer associated with a second call may point to location 2000, and the like.

In this embodiment, processor 90 is also used to send and receive packets of data across network 220. This embodiment includes two types of packets, packets that include control and status data, and packets that include voice data. Typically, the control data, is used to help set up communications between a server and a client. In this example, the control data may include the network call-back address of the caller.

In the present embodiment, processor 90 utilizes the Internet Protocol (IP) for enhancing packet transmission reliability over a packetized network. In a packet sending mode, processor 90 receives packets of TCP data from packet portion 340, and then divides the TCP packets into shorter packets of data. In the present embodiment, signal processor 380 provides the TCP packetizing of switching data and voice data. In this embodiment, processor 90 uses IP to format the TCP packets into TCP/IP packets and then sends the TCP/IP packets across network 220. According to TCP/IP protocol, processor 90 also monitors network 220 for ACK signals from the receiving telecommunications system. In alternative embodiments, processor 90 performs the TCP packetizing in addition to IP packetizing. In such embodiments, packet portion 340 delivers streams of digital data (such as switching data and voice data) to processor 90.

Processor 90 also receives TCP packets from packet sending telecommunications systems, and in response sends ACK signals back to the other systems. In the present embodiment, processor 90 strips IP headers from the packets and then forwards the received TCP packets to telecommunications server 70. More specifically, the TCP packets are sent to packet portion 340 for processing. In the present embodiment, processor 90 may utilize other network protocols in addition to or instead of IP, for example, UDP or the like. In the present embodiment, signal processor 380 receives the TCP packets and reassembles them into the right order. The switching and voice data recovered are then sent to signal processor 200 for further processing.

Signal processor 380 is embodied as a Texas Instruments TMS320C6201 digital signal processor (DSPs), and is coupled to receive instructions, data, and the like from processor 90, and/or signal processor 200. Of course DSPs from other manufacturers may be used in other embodiments of the present invention. In the present embodiment, memory 390 is used to store local instructions, data for signal processor 380, intermediate data, embodiments of the invention, and the like.

In one embodiment of the present invention, processor 90 supports multiple telephone handsets of different types for a single extension of a user. For example, analog, IP, digital, and wireless handsets may be used to receive calls for a single extension. Thus, no matter what type of handset is used and no matter where a user resides, a caller can reach the user through the same extension of the user. An extension for a user may be a telephone number, a telephone number with an extension, an IP address, an email address, and the like.

A user may log-in any handset as an active handset for the extension. Processor 90 then forwards calls for extension to the active handset. For example, the active handset may be an IP phone, an analog phone, or any other handset. Also, the active handset may be the handset for the user's original extension.

In one embodiment, processor 90 receives a telephone call for a user's original extension. In one embodiment, the user's original extension is an extension compatible with a PSTN network. Processor 90 then determines the active extension of the user and connects the call to the user at the active handset.

Figure 4:
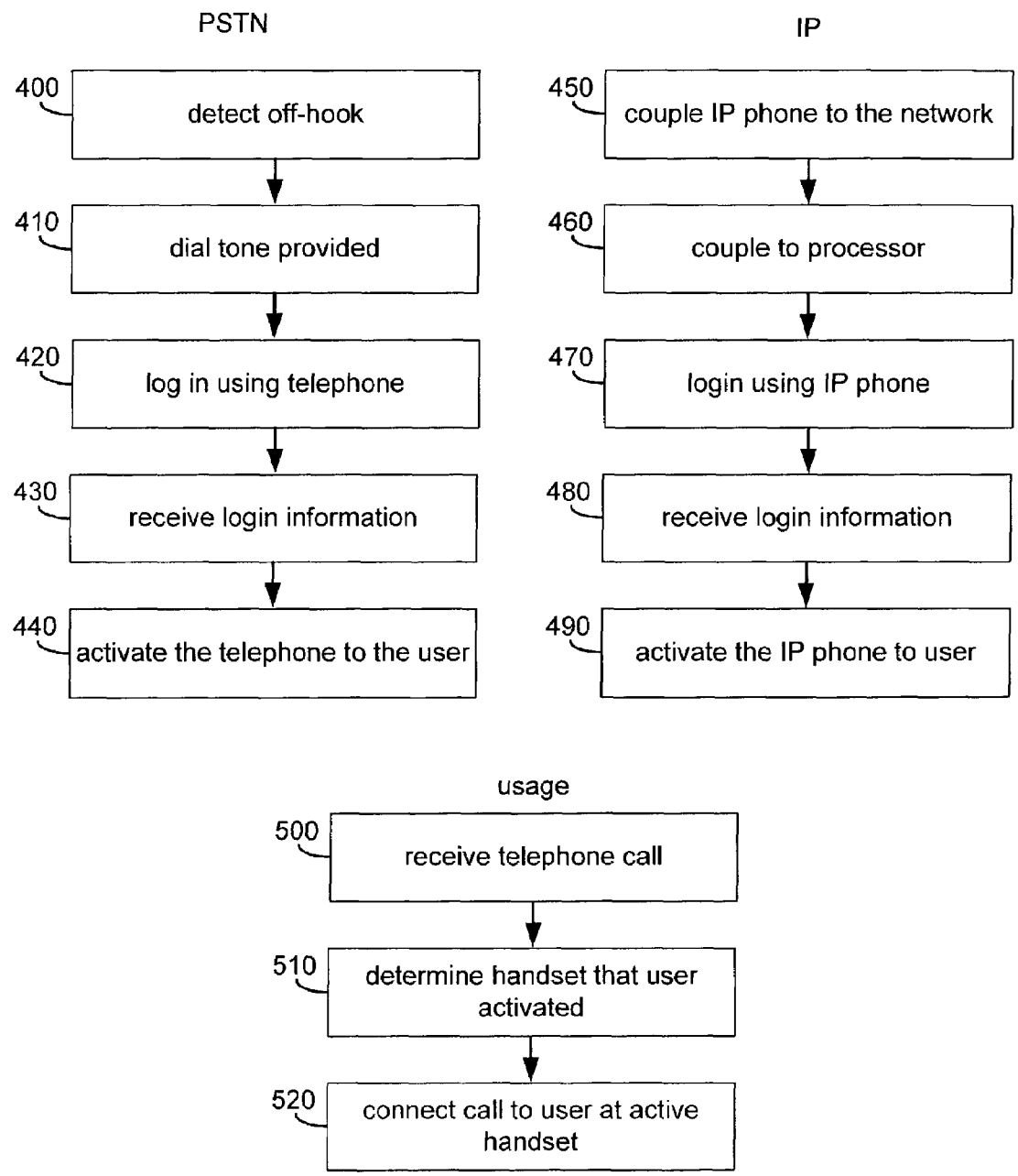
FIG. 4 illustrates a flow chart of an embodiment of the present invention.

FIG. 4 illustrates a flow chart of an embodiment of the present invention. The flow chart will be described using handset 240 and IP telephone handset 145; however, it will be understood that devices other than handsets 240 and IP telephones 145 may be used, such as wireless telephones, PDAs, etc.

FIG. 4 is separated into three sections—PSTN, IP, and usage. The PSTN and IP sections represent methods for activating an extension for handset 240 and IP telephone 145, respectively. In one embodiment, handset 240 is compatible with a PSTN network and IP telephone 145 is compatible with a packet-switched network. Only one handset may be activated at a time; however, a user may register any number of handsets for an extension.

In step 400, an off hook at handset 240 is detected. Examples of the telephone going off-hook include, a caller picking up a handset, hitting a speakerphone button, or the like. In response, a dial tone is then provided to the telephone in step 410.

In step 420, a user of the handset 240 logs in to processor 90 using handset 240. By logging into processor 90, a user of handset 240 may access features provided by processor 90, such as call forwarding. For example, a user may choose to de-activate call forwarding or activate call forwarding for a selected EP telephone 145. For discussion purposes, it will be assumed that a user will activate call forwarding. In one embodiment, the user may enter log-in information such as an account number, telephone number of the user's extension, password, and the like. In one embodiment, the user enters numbers by pressing a series of keys (numeric, *, and # keys) on the telephone keypad. In other embodiments, the user may enter speed dial numbers, such as "*8", or the like; the user may hit a button pre-programmed with the telephone number, or the like. In still other embodiments, the user may speak one or more words into the handset. In response, using speech recognition techniques, signal processor 90 can determine the telephone number in response to the spoken word(s).

In one embodiment, the user may log in using a dynamic or static login. Whether the dynamic or static login is used may be configured by either an administrator with access to processor 90 or the user. A dynamic login allows a user to enter a number of a handset where calls to the user's extension will be forwarded. Using a dynamic login, the user may use handset 240 to log in and specify to processor 90 the telephone number of another handset 240 where the calls will be forwarded. In another embodiment, a static login allows a user to automatically use a handset that is associated with the user's account.

In step 430, processor 90 receives the log-in information from the user. The log-in information includes a telephone number where processor 90 will forward calls for the user's original extension. When a user is logged in, calls will be forwarded to the active handset.

In step 440, processor 90 actives a handset 240 as the active handset for the user's extension with memory storage 110. The process then proceeds to step 500, described below.

One embodiment of registering IP telephone 145 will now be described. In step 450, IP telephone 245 is coupled to network 220. This may be done in a variety of conventional ways such as in an intranet connection, Internet connection, dial-up service, or the like. In step 460, IP telephone 145 couples to processor 90.

In step 470, the user logs in using IP phone 145. The user may log-in by coupling to processor 90 or through an Internet Service Provider (ISP). In one embodiment, IP phone 145 sends an IP address to connect to processor 90. Also, IP phone 145 sends the user's extension and password. The user may again use either a dynamic or static login. In this embodiment, the dynamic login allows a user to enter a network address of IP phone 145 where calls to the user's extension should be forwarded to. In another embodiment, when IP phone 145 is connected, dynamic host configuration protocol (DHCP) may be used to assign an IP address for IP phone 145. The assigned address is then sent to processor 90. Thus, when the same IP phone 145 is moved from different locations, its IP address may be different through the DHCP. However, through a plug and play (PNP) process, processor 90 will receive the updated IP address. Thus, the user may use any computing device for logging in and specifying the network address of the IP phone. Further, in this embodiment, the static login allows a user to automatically activate a network address that is associated with the user when the user logs in. This network address is typically pre-specified.

The network address received from the user may be stored in memory storage 110 and retrieved by processor 90. In one embodiment, the network address is an IP address of IP phone 145. In alternative embodiments, the network address may be any number, characteristics, or words that represent a path to IP phone 145. For example, a domain name, a uniform resource locator (URL), or the like may be used.

In step 480, processor 90 registers the log-in information from, for example, IP phone 145 if a dynamic extension is used or from memory storage 110 if a static extension is used. In response, processor 90 then activates the network address as the active extension to the user (step 490). When a user is logged-in, processor 90 forwards call for the user's extension to the active IP telephone 145.

In one embodiment, an extension may be registered by an administrator with proper rights to access processor 90. In this embodiment, the administrator may assign/remove any extension number to/from an IP telephone 145 or handset 240 through processor 90 and software designed to allow access and the assignment and removal.

The usage of the system will now be described. In step 500, a telephone call for the user is sent to the user's original telephone number or extension.

In step 510, processor 90 receives the call for the user at the user's extension and determines where the user is logged in. In one embodiment, processor 90 determines the active handset for the user. The active handset is the user's handset that has been activated as described above. For example, if the user had logged in and activated a handset 240, that handset 240 would be the active handset. As another example, if the user had logged in and activated the network address of an IP phone 145 as the active handset, that IP phone 145 would be the active handset.

In step 520, processor 90 connects a call to the user at the active handset. The call may be connected by a variety of methods depending on the type of handset that is active and the location of the handset. For example, if the active handset is the original handset at the extension, processor 90 forwards the data packets to a telecommunications server for processing. The server then reassembles the packets, converts the packets to analog voice data, and sends the analog voice data to handset 240 at the extension. If the active handset is an IP handset, processor 90 forwards the data packets through network 220 to the IP address. In one embodiment, a telecommunications server receives the packets, reassembles the packets, and sends the packets to IP phone 145 for the IP address. If the active handset is an analog handset, processor 90 makes a telephone call via a trunkline or to an internal extension.

Figure 5:
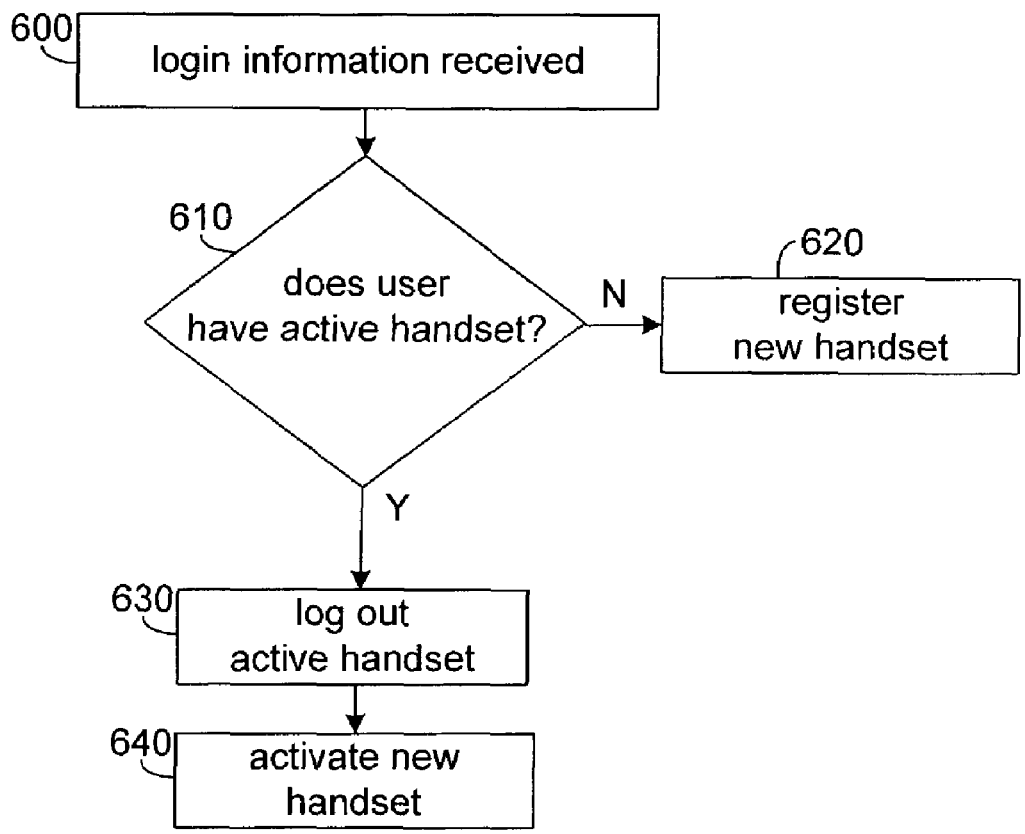
FIG. 5 illustrates one embodiment of a process for determining an active extension for a user.

FIG. 5 illustrates a flow diagram according to an embodiment of the present invention. In particular, FIG. 5 illustrates one embodiment of a process for determining an active extension for a user.

In step 600, log-in information is received from a handset of a user. For example, as in step 420 and step 470, a user logs in at handset 140 or IP handset 145. Depending on which handset the user is logging in, processor 90 may receive a telephone number or a network address from the user.

In step 610, the process determines if a handset is active for the user. If no handset is active for the user, the process activates the handset that is being logged in as the active handset (step 620). For example, handset 140 or IP telephone 145 may be activated for the user.

If a handset is active for the user, the process logs out the active handset (step 630). Then, in step 640, the new handset is activated as the active handset.

Figure 6:
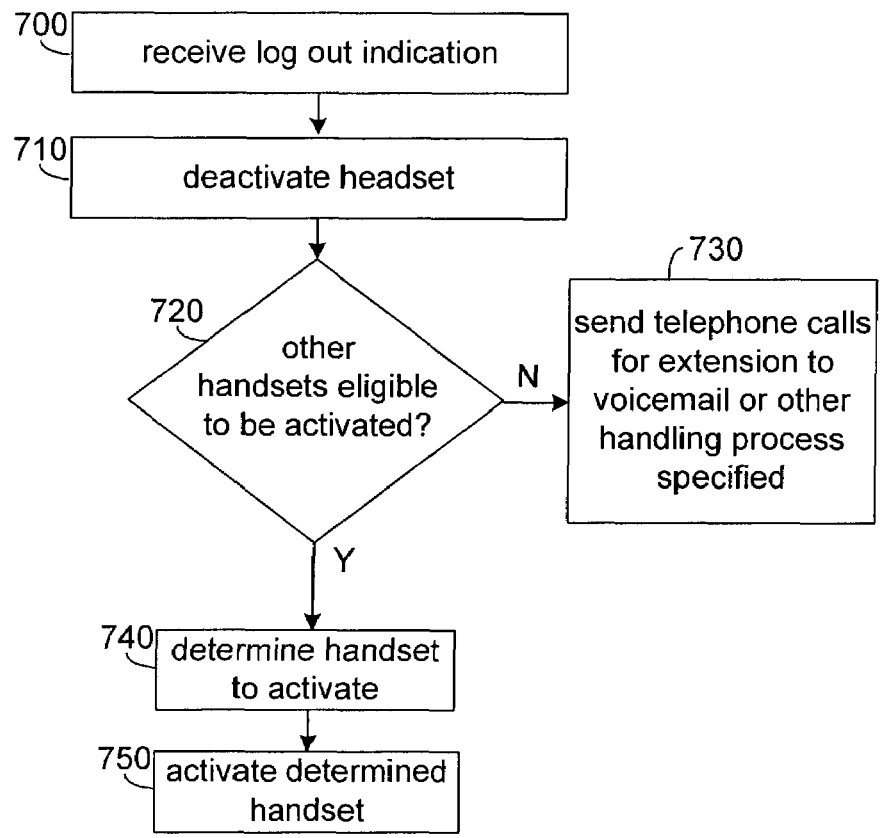
FIG. 6 depicts a simplified flow chart of a log out process according to one embodiment of the present invention.

FIG. 6 depicts a simplified flow chart of a log out process according to one embodiment of the present invention. In step 700, a user logs out the active handset. In step 710, the handset is deactivated.

In step 720, the process determines if other handsets that are deactivated are available for activation. For example, the handset that was deactivated during the log in process described in FIG. 5 may be determined. Also, other handsets that may be registered for the extension may be activated.

In step 730, if there are no handsets that are available for activation, the process may send follow any process that is specified. For example, the process may send calls to voicemail provide a busy signal, or assign a virtual extension to the extension. A virtual extension is an extension without a handset assigned to it.

In step 740, a handset to activate is determined. The handset to activate may be determined using an algorithm. For example, the last active handset may be activated. Also, a default handset may always be activated.

In step 750, the determined handset is activated. Thus, only one handset can be active for the user and a currently active handset is deactivated if it is active. This removes confusion as to what handset is active.

Embodiments of the present invention provide a system that supports handsets of multiple types and may be used for a single extension of a user. For example, analog and IP handsets may be used for call forwarding from a single extension. Thus, calls for an original extension may be forwarded to any handset that the user may be using. Accordingly, no matter what type of handset the user is using and wherever the user resides, a call can reach the user through the same phone number or extension number.

The above description is illustrative but not restrictive. Many variations of the invention will become apparent to those skilled in the art upon review of the disclosure. For example, any handset capable of receiving telephone calls may be used, such as wireless, digital, analog, IP, and soft handsets. The scope of the invention should, therefore, be determined not with reference to the above description, but instead should be determined with reference to the pending claims along with their full scope or equivalents.

What is claimed is:

1. A method for connecting a telephone call directed to an extension coupled to a Public Switched Telephone Network (PSTN) to a handset addressable and connectable via an IP address of a packet switched network, the method operative in a processor controlling access between the extension in the PSTN and the IP addressable handset in the packet switched network, comprising:
   receiving log-in information for the IP addressable handset coupled to the packet switched network;
   activating the IP addressable handset using the log-in information; thereupon deactivating an active PSTN handset for the extension corresponding to the active IP addressable handset;
   receiving a telephone call for the extension;
   determining a network address associated with the IP addressable handset; and
   connecting the telephone call through the packet switched network to the IP addressable handset coupled to the packet switched network at the network address.

2. The method of claim 1, wherein the PSTN handset for the extension comprises at least one of an analog handset, digital handset, and wireless handset.

3. The method of claim 1, wherein the handset coupled to the packet switched network is an IP handset.

4. The method of claim 1, wherein receiving log-in information comprises receiving a network address.

5. The method of claim 1, wherein the network address comprises an IP address.

6. The method of claim 1, further comprising:
   storing a network address received from the log-in information; and
   associating the stored network address with the IP addressable handset.

7. The method of claim 1, further comprising associating a stored network address with the IP addressable handset when the log-in information is received.

8. The method of claim 1, wherein connecting the telephone call to the IP addressable handset comprises connecting the telephone call to a telecommunications server, wherein the telecommunications server connects the telephone call to the IP addressable handset.

9. The method of claim 1, further comprising:
   receiving log-out information for the active IP addressable handset of the extension; and
   deactivating the active IP addressable handset for the extension in response to receiving the log-out information.

10. The method of claim 1, further comprising:
    receiving a telephone call for the extension;
    determining a path to connect to the determined IP addressable handset;
    addressing the telephone call to the determined IP addressable handset through the path.

11. A computer program product including tangible memory having code executable on the processor and configured to direct a telecommunications system to operate according to the method of claim 1.

12. A method for connecting a telephone call directed to an extension to an active handset that is addressable and connectable via an IP address, the method comprising:
    receiving log out information for an active handset of the extension; thereupon
    deactivating the active handset for the extension;
    receiving log in information for determining a next handset to activate for the extension using the next login information; thereafter
    activating the determined next handset for the extension;
    receiving a telephone call for the extension;
    determining a path to connect the telephone call to the activated next handset; and
    routing the telephone call to the activated next handset through the path.

13. The method of claim 12, wherein the next activated handset comprises an IP handset.

14. The method of claim 13, wherein the path comprises a network address of the IP handset.

15. The method of claim 14, wherein the network address comprises an IP address.

16. The method of claim 12, wherein connecting the telephone call to the next handset comprises connecting the telephone call to a telecommunications server, wherein the telecommunications server connects the telephone call to the next handset.

17. A computer program product including tangible memory having code executable on a processor and configured to direct a telecommunications system to operate according to the method of claim 12.

18. A method for connecting a telephone call for an extension to a handset, wherein the handset includes at least one of a first handset coupled to a packet switched network and a second handset coupled to a Public Switched Telephone Network (PSTN), the method comprising:

receiving log-in information for a handset, wherein the handset may be one of the first handset and the second handset; thereupon deactivating an active handset for the extension in response to receiving the log-in information; thereafter activating the next handset using the log-in information;

receiving a telephone call for the extension;

determining a path to connect to the next handset, wherein the path is through the PSTN network if the next handset is the first handset and the path is through the packet-switched network if the next handset is the second handset; and routing the telephone call to the activated next handset through the path.

19. The method of claim 18, wherein the first handset comprises at least one of an analog handset, digital handset, and wireless handset.

20. The method of claim 18, wherein the second handset comprises an Internet Protocol (IP) handset.

21. The method of claim 18, wherein receiving log-in information comprises receiving a network address.

22. The method of claim 21, wherein the network address comprises an IP address.

23. The method of claim 18, further comprising:

storing a network address received from the log-in information; and associating the stored network address with the IP handset.

24. The method of claim 23, further comprising associating a stored network address with the IP handset when the log-in information is received.

25. The method of claim 18, wherein addressing the telephone call to the next handset through the path comprises connecting the telephone call to a telecommunications server, wherein the telecommunications server connects the telephone call to the next handset.

26. The method of claim 18, further comprising:

receiving log-out information for an active handset of the extension; and deactivating the active handset for the extension in response to receiving the log-out information.

27. The method of claim 26, further comprising:

determining a handset to activate for the extension; and activating the determined handset for the extension.

28. The method of claim 27, further comprising:

receiving a telephone call for the extension;

determining a path to connect to the determined handset;

addressing the telephone call to the determined handset through the path.

29. A computer program product including tangible memory having code executable on the processor and configured to direct a telecommunications system to operate according to the method of claim 18.

* * * * *